(12) United States Patent
Sawa et al.

(10) Patent No.: US 9,527,067 B2
(45) Date of Patent: Dec. 27, 2016

(54) INORGANIC/POLYMERIC HYBRID CATALYTIC MATERIALS CONTAINING METAL NANO-PARTICLES THEREIN

(75) Inventors: Haruo Sawa, Kochi (JP); Pierluigi Barbaro, Sesto Fiorentino (IT); Claudio Bianchini, Sesto Fiorentino (IT); Francesca Liguori, Sesto Fiorentino (IT)

(73) Assignee: NIPPON KODOSHI CORPORATION, Kochi-shi (JP)

(*) Notice: Subject to any disclaimer, the term of this patent is extended or adjusted under 35 U.S.C. 154(b) by 51 days.

(21) Appl. No.: 14/129,009

(22) PCT Filed: Jun. 24, 2011

(86) PCT No.: PCT/JP2011/065129
§ 371 (c)(1),
(2), (4) Date: Dec. 23, 2013

(87) PCT Pub. No.: WO2012/176341
PCT Pub. Date: Dec. 27, 2012

(65) Prior Publication Data
US 2014/0128251 A1    May 8, 2014

(51) Int. Cl.
*B01J 21/00* (2006.01)
*B01J 23/00* (2006.01)
(Continued)

(52) U.S. Cl.
CPC .......... *B01J 31/123* (2013.01); *B01D 67/0079* (2013.01); *B01D 69/145* (2013.01);
(Continued)

(58) Field of Classification Search
USPC .......................... 502/159, 100, 150
See application file for complete search history.

(56) References Cited

U.S. PATENT DOCUMENTS 7,101,638 B2 * 9/2006 Sawa .................. 429/491
7,396,616 B2 * 7/2008 Sawa .................. 429/313
(Continued)

FOREIGN PATENT DOCUMENTS

DE  10 2005 011 544   9/2006
DE  10 2008 030 659   1/2009
(Continued)

OTHER PUBLICATIONS

Shanmugam, S. et al., "A novel single step chemical route for noble metal nanoparticles embedded organic-inorganic composite films", Materials Chemistry and Physics, vol. 95, No. 1, pp. 51-55, (Jan. 10, 2006) XP024994625.

(Continued)

*Primary Examiner* — James McDonough
(74) *Attorney, Agent, or Firm* — Oblon, McClelland, Maier & Neustadt, L.L.P.

(57) ABSTRACT

Catalytic materials with high activity in various chemical reactions as well as high durability are described. The catalytic materials are composed of specific, hybrid combinations of inorganic/polymeric compounds containing metal nano-particles therein, and can be easily reused with negligible catalysts leaching. They are particularly useful, but not limited to, the hydrogenation of substituted α,β unsaturated acids or esters.

19 Claims, 2 Drawing Sheets

(51) Int. Cl.
B01J 25/00 (2006.01)
B01J 29/00 (2006.01)
B01J 31/00 (2006.01)
B01J 31/12 (2006.01)
B01D 67/00 (2006.01)
B01D 69/14 (2006.01)
B01J 31/16 (2006.01)
B01J 35/06 (2006.01)
B01J 21/06 (2006.01)
B01J 21/08 (2006.01)
B01J 23/38 (2006.01)
B01J 23/44 (2006.01)
B01J 23/46 (2006.01)
B01J 23/52 (2006.01)
B01J 23/70 (2006.01)
B01J 37/02 (2006.01)
B01D 71/38 (2006.01)
B01J 37/06 (2006.01)
B01J 37/16 (2006.01)
B01J 37/18 (2006.01)
B01J 23/42 (2006.01)
B01J 23/50 (2006.01)
B01J 35/00 (2006.01)

(52) U.S. Cl.
CPC .......... B01D 69/148 (2013.01); B01J 21/066 (2013.01); B01J 21/08 (2013.01); B01J 23/38 (2013.01); B01J 23/44 (2013.01); B01J 23/462 (2013.01); B01J 23/464 (2013.01); B01J 23/52 (2013.01); B01J 23/70 (2013.01); B01J 31/165 (2013.01); B01J 35/002 (2013.01); B01J 35/006 (2013.01); B01J 35/065 (2013.01); B01J 37/0203 (2013.01); B01J 37/0209 (2013.01); B01D 71/38 (2013.01); B01D 2325/10 (2013.01); B01J 23/42 (2013.01); B01J 23/50 (2013.01); B01J 35/0013 (2013.01); B01J 37/06 (2013.01); B01J 37/16 (2013.01); B01J 37/18 (2013.01); Y02E 60/522 (2013.01); Y02E 60/523 (2013.01)

(56) References Cited

U.S. PATENT DOCUMENTS

| | | |
|---|---|---|
| 2003/0150719 A1 | 8/2003 | Sawa |
| 2004/0062970 A1 | 4/2004 | Nomura et al. |
| 2006/0008692 A1* | 1/2006 | Sawa ............... G01N 27/4073 429/493 |
| 2007/0213495 A1 | 9/2007 | Nomura et al. |
| 2008/0004457 A1* | 1/2008 | Fritsch et al. ............ 554/141 |
| 2008/0058200 A1 | 3/2008 | Kobayashi et al. |
| 2009/0068531 A1* | 3/2009 | Sawa ............... C08J 5/2256 429/417 |
| 2009/0098466 A1* | 4/2009 | Sawa ............... C08K 3/10 429/307 |
| 2011/0027385 A1* | 2/2011 | Cairns ............... A61L 2/23 424/618 |
| 2011/0117474 A1 | 5/2011 | Sawa |

FOREIGN PATENT DOCUMENTS

| | | |
|---|---|---|
| JP | 2006-102709 A | 4/2006 |
| JP | 3856699 | 12/2006 |
| JP | 3889605 | 3/2007 |
| JP | 4041422 | 1/2008 |
| JP | 2008-31297 A | 2/2008 |
| WO | 2005/085307 | 9/2005 |
| WO | 2011 121797 | 10/2011 |

OTHER PUBLICATIONS

Sawa, H. et al., "Proton Conductive Electrolyte Membranes Based on Tungstic Acid and Poly(vinyl alcohol) Hybrid Compounds", Technological Report, vol. 72, No. 2, pp. 111-116, (2004).

Mertens, P. G. N. et al., "Membrane-Occluded Gold-Palladium Nanoclusters as Heterogeneous Catalysts for the Selective Oxidation of Alcohols to Carbonyl Compounds" Adv. Synth. Catal, vol. 350, pp. 1241-1247, (2008).

Schmidt, A. et al., "Selectivity of partial hydrogenation reactions performed in a pore-through-flow catalytic membrane reactor", Catalysis Today, vol. 104, pp. 305-312, (2005).

Groschel, L. et al., "Hydrogenation of Propyne in Palladium-Containing Polyacrylic Acid Membranes and Its Characterization", Ind. Eng. Chem. Res, vol. 44, pp. 9064-9070, (2005).

Kidambi, S. et al., "Multilayered Polyelectrolyte Films Containing Palladium Nanoparticles: Synthesis, Characterization, and Application in Selective Hydrogenation", Chem. Mater, vol. 17, pp. 301-307, (2005).

Wang, X. et al., "Preparation and characterization of PAA/PVDF membrane-immobilized Pd/Fe nanoparticles for dechlorination of trichloroacetic acid," Water Research, vol. 42, pp. 4656-4664, (2008).

International Search Report Issued Feb. 1, 2012 in PCT/JP11/065129 Filed Jun. 24, 2011.

U.S. Appl. No. 14/378,207, filed Aug. 12, 2014, Sawa, et al.

Office Action issued Jun. 9, 2015 in Japanese Patent Application No. 2013-557968 (with English language translation).

Office Action issued Oct. 27, 2014 in Japanese Patent Application No. 2013-557968 (with English translation).

* cited by examiner

INORGANIC/POLYMERIC HYBRID CATALYTIC MATERIALS CONTAINING METAL NANO-PARTICLES THEREIN

CROSS REFERENCE TO RELATED APPLICATION

This application is a 371 of PCT/JP2011/065129, filed on Jun. 24, 2011.

FIELD OF THE INVENTION

The present invention relates to new inorganic/polymeric hybrid catalytic materials, especially membranes, exhibiting high activity, stability, reusability and low metal leaching in a variety of chemical reactions. More specifically, the present invention relates to the manufacture of polyvinyl alcohol-based hybrid catalytic materials (membranes) and their use in chemical processes. The catalytic materials (membranes) are particularly useful, but not limited to, the hydrogenation of unsaturated chemical compounds.

BACKGROUND OF THE INVENTION

Due to their very large surface area, metal nanoparticles (MNPs), especially those of noble metals, such as platinum, palladium, ruthenium, rhodium and gold, are widely used as effective catalysts in various kinds of chemical processes. In most cases, MNPs are immobilized onto solid support materials or stabilized as colloidal solutions. The support materials are generally based on porous inorganic materials, such as carbon, silica, titania or alumina, in order to allow an easy access of all reactants to the catalyst surface. A common strategy to immobilize MNPs onto a support material is the impregnation method in which the support is immersed into a solution of a metal precursor, dried and calcined. After that, the metal is reduced by some reducing agent, often under harsh conditions, to form metal nanoparticles. However, it is difficult to control the particle size by this method, as the size distribution can be wide with particles beyond ten nanometers or more.

Catalytic materials based on MNPs onto support materials suffer of other problems as far as their reuse and engineering into reactors is concerned. Use of batch reactors in a two phase liquid system involves the recover of the catalyst from the reaction solution after reaction completion by appropriate methods, such as filtration and centrifugation. However, it is not easy to separate the catalysts, when they are in the form of fine powders. In some cases, separation may require ultrafiltration. Very fine powders may also clog or poison the reactors or the autoclaves employed in the chemical reaction. The support material may also pulverize upon stirring. Further, catalyst particles on support materials tend to aggregate upon use to form larger particles having smaller surface area and, hence, lower activity, ultimately resulting in catalyst deactivation after prolonged use. Metal leaching from the catalyst to the reaction solution may also represent a serious problem in terms of contamination of products for the fine chemical industry, (pharmaceutical, perfumery)

Due to the abovementioned reasons, most supported MNP-based catalysts are difficultly adaptable into efficient reactors suitable for the large scale-production of fine-chemicals.

One of the inventors of the present invention described new inorganic/polymeric hybrid membranes in *Electrochemistry*, 72, 111-116 (2004), JP 3889605, U.S. Pat. No. 7,101,638, JP 3856699. The membranes consist of a hybrid compound of inorganic oxides and polyvinyl alcohol (PVA), in which the inorganic oxides are chemically combined with PVA through its hydroxyl groups. These materials are produced by simple processes in an aqueous solution, in which salts of inorganic oxides are neutralized by acid in the condition that PVA co-exists. By this method, the nascent and active inorganic oxides generated by neutralization combine and hybridize with PVA to form the hybrid compound. The hybrid compounds are distinguished from mixtures of inorganic oxides and PVA, that is, their chemical properties are remarkably changed from their raw materials. For example, once hybridized materials are insoluble in any solvents including hot water in spite of being made from PVA soluble in water.

These membranes have been developed for application as proton conductive solid electrolytes, especially in fuel cells. Accordingly, they have high chemical resistance against oxidation, reduction and radical attack as well as high thermal resistance. In that kind of electrolyte, protons are carried by using water molecules, as membranes are able to absorb water. In these hybrid membranes, inorganic oxides are dispersed as a very fine (nano-sized) particle, because PVA prevents the inorganic oxide from growing to a large size particle during the synthesis process of the hybrid compound.

No literature data are known in which the above membranes were used as support for MNP-based catalysts. The inventors of the present application disclosed these kinds of hybrid membranes as support material for molecular catalysts in PCT/JP2010/056288, wherein the immobilized molecular catalysts were limited to molecular metal complex, and not MNPs.

Catalytic membranes based on purely organic polymers embedding metal nanoparticles were previously described in the literature which do not contain any inorganic components, however: *Adv. Synth. Catal.* 350, 1241-1247 (2008), *Catal. Today* 104, 305-312 (2005) and *Ind. Eng. Chem. Res.* 44, 9064-9070 (2005) describe catalytic membranes based on Pd and Au NPs into polyacrylic acid and polyvinylpyrrolidone for use in hydrogenation and oxidation reactions; *Chem. Mat.* 17, 301-307 (2005) describes polyethylenimine and polyacrylic acid-based membranes containing Pd NPs for the catalytic hydrogenation of allylic alcohols; *Water Res.* 42, 4656-4664 (2008) describes Pd/Fe NPs into Polyvinylidene fluoride-based membranes for the catalytic dechlorination of trichloroacetic acid.

SUMMARY OF THE INVENTION

The present inventions relates to the preparation and use of catalytic materials, especially catalytic membranes, for chemical reactions. The term "catalytic material (membrane)" is used hereinafter to denote an inorganic/polymeric hybrid compound material (membrane) embedding metal particles and featured by catalytic activity. The inorganic/polymeric hybrid compound is composed of metal oxides and organic polymers having hydroxyl groups, wherein the metal oxides contain at least one selected from silicon and zirconium, which are chemically combined with the organic polymers by their hydroxyl groups. The metal particle catalysts immobilized within the inorganic/polymeric hybrid material (membrane) consist of aggregates of metal atoms in the zero-valent state whose dimensions are generally below 1 μm.

One aspect of the present invention relates to the preparation of catalytic materials (catalytic membranes). Another aspect of the present invention relates to the application of the aforementioned catalytic materials (membranes) to chemical processes, for example hydrogenations, dehydrogenations, hydrogenolysis, hydroformylations, carbonylations, oxidations, dihydroxylations, epoxidations, aminations, phosphinations, carboxylations, silylations, isomerizations, allylic alkylations, cyclopropanations, alkylations, allylations, arylations, methatesis and other C—C bond forming reactions.

DETAILED DESCRIPTION OF THE INVENTION

Figure 1:
FIG. 1 is a typical TEM image of a cross-section of hybrid catalytic membrane containing Pd nanoparticles (300 K magnification).

The present invention provides new catalytic materials, especially membranes, for chemical reactions having high catalytic activity and high durability. The catalytic materials (membranes) of the invention are composed of an inorganic/polymeric hybrid material (membrane) containing a metal catalyst.

The inorganic/polymeric hybrid material (membrane) is the hybrid of inorganic oxides and a polymer having hydroxyl groups. Furthermore, the inorganic oxide is preferably silicic acid compounds and zirconic acid compounds. Silicic acid means the compound contains $SiO_2$ as its compositional unit as well as containing water molecules, and can be denoted by $SiO_2 \cdot xH_2O$. In the present invention, silicic acid compound means silicic acid and its derivatives, or any compounds containing silicic acid as a main component. Zirconic acid means the compound containing $ZrO_2$ as its compositional unit as well as containing water molecules, and can be denoted by $ZrO_2 \cdot xH_2O$. In the present invention, zirconic acid compound means zirconic acid and its derivatives, or any compounds containing zirconic acid as a main component. The zirconic acid compounds are employed more preferably.

The silicic acid compounds and the zirconic acid compounds may either contain other elements, have non-stoichiometric composition and/or to contain some additives, provided that the original properties of silicic acid and zirconic acid are maintained.

For the inorganic/polymeric hybrid material, organic polymers having hydroxyl groups suit to the organic constituent, because hydroxyl groups may combine with the inorganic oxide. Moreover, a water-soluble polymer is preferable because, in most cases, the hybridization processes is carried out in aqueous environment. For the above reasons, polyvinyl alcohol (PVA) is the most suitable component. Pure PVA and/or its modifications, i.e. PVA derivatives in which the hydroxyl groups are (partially) substituted with other groups or partial block copolymerization compounds, can be used for this purpose.

Furthermore, other polymers, for example, polyolefin polymers such as polyethylene and polypropylene, polyacrylic polymers, polyether polymers such as polyethylene oxide, and polypropylene oxide, polyester polymers such as polyethylene terephthalate and polybutylene terephthalate, fluorine polymers such as polytetrafluoroethylene and polyvinylidene fluoride, glycopolymers such as methyl cellulose, polyvinyl acetate polymers, polystyrene polymers, polycarbonate polymers, epoxy resin polymers or other organic and inorganic additives are allowed to be mixed into the hybrid material (membrane).

The organic/inorganic hybrid materials (membranes) are made by a simple aqueous process. In the case of the silicic acid type, the hybrid is synthesized by neutralization with an acid of a silicate aqueous solution containing the polymer having hydroxyl groups, such as PVA. In this process, silicate changes to the silicic acid compounds by neutralization. The newborn and nascent compounds are so active that they have a tendency to combine each other. However, in this method, the polymer co-exists close to the inorganic compounds, so the newborn and nascent compounds combine to the hydroxyl groups of the polymers by dehydration combination. The final hybrid materials are formed by removing the solvent (water) from the above-mentioned precursor solution after the co-existent neutralization process. The membranes can be made by a common casting method using the above-mentioned precursor solution. The fibers of this hybrid compound can be made by the spunbond method, the melt-blow method or the electro-spinning method. The inorganic/polymeric hybrid materials (membranes) show high affinity to water or other solvents having high polarity, and swell by absorborption of these solvents. The swelling degree of the membrane can be adjusted by the aldehyde treatment (*Electrochemistry*, 72, 111-116 (2004), JP 4041422, U.S. Pat. No. 7,396,616). In the aldehyde treatment, the free hydroxyl groups of the polymer remaining in the inorganic/polymeric hybrid are combined with aldehydes, such as glutaraldehyde, phthalaldehyde, glyoxal and butyraldehyde by contacting the membrane with a solution or a gas reactant including the aldehyde. By the aldehyde treatment, the polymer component is cross-linked or converted in an hydrophobic derivative so that the swelling degree of the membrane is adjusted.

In order to immobilize the metal catalysts onto the silicic acid type hybrid materials, the materials are immersed into a solution of a metal salt, such as nitrate or sulphate, and absorb these salts inside. After impregnation of the metal, the materials are washed with pure solvent and the absorbed salts are reduced by an appropriate reducing agent, such as hydrogen or sodium borohydride to turn into a metal form.

In the case of the zirconic acid type, the hybrid is synthesized by neutralizing zirconium salt or oxyzirconium salt by alkali in an aqueous solution containing the polymer having hydroxyl groups, such as PVA. In this process, zirconic salt or oxyzirconic salt changes to the zirconic acid compounds by neutralization to combine the co-existent organic polymer like as the case of the silicic acid type hybrid. The final hybrid materials are formed by removing the solvent (water) from the above-mentioned precursor solution after the co-existent neutralization process. The membranes can be made by a common casting method using the above-mentioned precursor solution.

In order to immobilize the metal catalysts onto the zirconic acid type hybrid materials a metal salt is added to the raw solution before neutralization. The salts are converted into metal oxides or hydroxides upon neutralization. The size of the immobilized metal oxides or hydroxides is very small (nano-sized), because PVA or zirconic acid compound prevents the metal oxides or hydroxides from growing to a large size particle during the synthesis process of the hybrid compound. After that, the metal oxides or hydroxides are reduced by an appropriate reducing agent, such as hydrogen and sodium borohydride, to turn into a metal form.

Another preparation method can be employed to synthesize the zirconic acid type hybrid materials. In this method, zirconium salt and/or oxyzirconium salt are partially hydrolyzed in an aqueous solution containing the polymer having hydroxyl groups, such as PVA, by heating the solution at appropriate temperature, for example 40-60° C. At this step, the hybridization is not completed and some zirconium salt and/or oxyzirconium salt are still present. A precursor of the hybrid materials is formed by removing solvent from the solution, for example by the casting method. The so formed solid mixture is then contacted with alkali to neutralize the remained zirconium salt and/or oxyzirconium salt and to complete the hybridization.

In this process, the metal catalyst can be introduced into the hybrid material by addition of a metal salt into the raw solution before the hydrolysis process. The salt is converted into metal oxides or hydroxides by the hydrolysis and neutralization process. After that, the immobilized metal oxides or hydroxides are reduced by an appropriate reducing agent, such as hydrogen and sodium borohydride, to turn into a metal particle form.

The catalytic metal particles obtained by the above described methods using the zirconium type hybrid materials are embedded into the material (membrane) so that they result particularly hard to be removed and leached into solution upon use of the material in catalysis.

Some porous matrix sheets, such as cloth, non-woven cloth or paper can be used in order to reinforce the organic/inorganic hybrid membranes. Any materials, such as polyester, polypropylene, polyethylene, polystyrene and nylon can be employed for the matrix as far as showing enough endurance.

Typical content of the metal particle catalyst in the catalytic materials of the present invention is in the range 0.2 to 10% by weight.

According to the present invention, metal particles with catalytic activity are meant composed by any metal, preferably at least one from the group of iron, cobalt, nickel, copper, ruthenium, rhodium, palladium, silver, osmium, iridium, platinum and gold, and with diameter size in the range 0.5-500 nm. Among them, ruthenium, rhodium, palladium, silver, platinum and gold are preferred for their higher stability According to the present invention, the catalytically active metal particles are generated from their corresponding oxides or metal salts immobilized into the inorganic/polymeric hybrid material by a reduction process, so that the hybrid material controls the growth of the metal particles.

The inorganic/polymeric hybrid materials of the present invention are permeable to solvents and gases. According to this property, chemical reaction catalyzed by the immobilized metal particles may occur both on the surface and within the hybrid material, thus resulting in a high catalytic activity. The hybrid material also hampers aggregation of the catalytic metal particles during catalysis, ultimately resulting in a constant catalytic activity upon reuse. Strong immobilization of the catalytically active metal particles within the hybrid material strongly limits their leaching into solution upon use.

The hybrid catalytic materials described in the present invention shows better performance, in terms of thermal, mechanical and chemical stability (e.g. resistance towards acids and bases, oxidants, radicals and solvents) compared to conventional organic polymeric support materials. Particularly, due to their cross-linkage to inorganic oxides, the hybrid materials of the present invention show better stability to polar and non-polar solvents and to temperatures above 200° C. compared to PVA.

Although the hybrid materials have the properties of inorganic oxides, they also have flexibility of organic polymers and are not brittle. In general chemical reaction of liquid system, the reaction solution is agitated, but the usual support materials, such as carbon or silica, are broken into smaller powders by impact during the agitation. The separation becomes more difficult by pulverization as well as the catalyst activity changes remarkably. The hybrid materials of this invention can make it possible to avoid this problem due to their flexibility.

In the case that PVA is used as a polymeric constituent of the inorganic/polymeric hybrid, the performance of the corresponding catalytic materials can be tuned by the saponification degree of PVA (concentration of acetyl groups): a high saponification degree enhances the catalytic activity in low-polar solvents.

The catalytic materials (membranes) can be adapted for use either in a fixed-bed (with stirred reaction solution) or in a rotating membrane assembly reactor. In both cases, the catalytic materials (membranes) can be easily and straightforwardly reused by removing the reaction solution of the previous reaction cycle, for example by simple decantation, and adding a new batch of solution containing the substrate, under the proper gas atmosphere. The heterogeneous nature of the catalytic materials (membranes), ensured by the absence of any catalytic activity of the reaction solution and by the negligible metal loss, allows for minimization of any impurity leached in the reaction solvent containing the desired product and, hence, in its recover without the need of any further purification step.

According to the present invention, the catalytic materials (membranes) prepared as above can be used to catalyze a variety of chemical reactions which include, but are not limited to: hydrogenations, dehydrogenations, hydrogenolysis, hydroformylations, carbonylations, oxidations, dihydroxylations, epoxidations, aminations, phosphinations, carboxylations, silylations, isomerizations, allylic alkylations, cyclopropanations, alkylations, allylations, arylations, methatesis and other C—C bond forming reactions. These reactions can be carried out either in solution or in a liquid-gas two phase system. Further, the catalytic membranes can be adapted to the engineering of batch reactors, working either in a fixed-bed or in a rotating membrane mode, or continuous flow reactors for those skilled in the art. When used in a batch mode, the catalytic materials (membranes) are typically introduced in the reactor in the presence of a solution containing the substrate and the reactants. When a gas reactant is to be used, it will be introduced in the reactor at the desired pressure in the range from 0.1 bar to 80 bar. Suitable solvents include, but are not limited to: alcohols (preferably methanol), glycols, water, ethers, ketones, esters, aliphatic and aromatic hydrocarbons, alkyl halogenides. Typical substrate concentration are in the range $1 \cdot 10^{-2}$ M to 10 M. Substrate:catalyst ratio, based on the measured metal content in the catalytic membrane, can vary from 10:1 to 100.000:1. Reactions can be performed with stirring in the temperature range from −40° C. to 150° C. Due to the fact that the catalytic materials (membrane) are insoluble solids and that the catalysts immobilized on and in them are heterogeneous, the reaction solution can be easily recovered at any time by simple decantation and the catalytic material (membrane) recycled by simple addition of a fresh solution containing the substrate and the reactants. Viability of the use of water as solvent is also worthy to be underlined because of its environmental compatibility.

In a preferred embodiment of the present invention, the catalytic membranes of the present invention are used in the hydrogenation of substrates including, but not limited to: alkenes, alkynes, imines, enamines, ketones, α,β-unsaturated alcohols, ketones, esters or acids. Preferential metal particle catalyst immobilized, but not limited to, are those of Ir, Rh, Ru, Pd, Au or their mixture thereof. According to one aspect of the present invention, an olefin having the formula

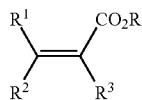

where R is hydrogen, alkyl containing from 1 to about 30 carbon atoms, aryl containing about from 6 to 18 carbon atoms, $R^1$, $R^2$ and $R^3$ are the same or different and containing hydrogen, alkyl containing from 1 to about 30 carbon atoms, alkenyl containing from 1 to about 30 carbon atoms, alkynyl containing from 1 to about 30 carbon atoms, aryl containing about from 6 to 18 carbon atoms, amide, amine, alkoxide containing from 1 to about 30 carbon atoms, ester containing from 1 to about 30 carbon atoms, ketone containing from 1 to about 30 carbon atoms, is hydrogenated by the catalytic membranes of the present invention. The aryl substituents may also be bicyclic, fused species or containing heteroatoms such as sulfur, oxygen, nitrogen, phosphorus. The olefin is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred olefins, but not limited to, are: methyl 2-acetamidoacrylate, 2-acetamidoacrylic acid, dimethylitaconate, itaconic acid, methyl 2-acetamidocinnamate, 2-acetamidocinnamic acid.

According to another aspect of the present invention, an alkyne having the formula

where $R^1$ is hydrogen, alkyl containing from 1 to about 30 carbon atoms, aryl containing about from 6 to 18 carbon atoms, amide, amine, alkoxide containing from 1 to about 30 carbon atoms, ester containing from 1 to about 30 carbon atoms, is hydrogenated by the catalytic membranes of the present invention to give preferentially the corresponding cis-alkene product. The aryl substituents may also be bicyclic, fused species or containing heteroatoms such as sulfur, oxygen, nitrogen, phosphorus. The alkyne is introduced in the reactor containing the catalytic membrane as solution in a suitable solvent, preferentially, but not limited to, methanol. The hydrogenation reaction is carried out in the temperature range from −40° C. to 150° C., for a period from 0.5 to 48 hours and under a hydrogen pressure ranging from 0.1 bar to 50 bar. Preferred alkynes, but not limited to, are 3-hexyn-1-ol.

In conclusion, the present invention describes the preparation and the use of catalytic materials (membranes) based on inorganic/polymeric hybrid materials containg metal particles, which catalyzes a variety of chemical reaction, and particularly highly selective reaction, in mild reaction conditions and with low metal leaching. The catalytic materials (membranes) are adaptable to the engineering of reactors and can be easily and efficiently reused.

The following examples are given to illustrate the scope of the present invention. Incidentally, the invention embodiment is not limited to the examples given hereinafter.

EXAMPLE I

This example illustrates the general procedure for the preparation of the catalytic materials, especially membranes, in accordance with the method of the present invention described above. A raw aqueous solution was obtained by mixing a predetermined amount of sodium silicate with a 100 ml of 10 weight % polyvinylalcohol (PVA) solution. The PVA has average polymerization degree of 3100-3900 and saponification degree of 86-90%. A hydrochloric acid solution of the concentration of 2.4 M is dropped into the raw aqueous solution with stirring for the co-existent neutralization, which induces the hybridization reaction.

This precursor solution was cast on the polyester film of the coating equipment in condition of heating the plate to a temperature of 60-80° C. The coating equipment is R K Print Coat Instruments Ltd. K control coater having a doctor blade for adjusting a gap with a micrometer and a polyester film set on a coating plate. Just after the precursor solution was cast on the plate, the precursor solution was swept by the doctor blade whose gap was adjusted to 0.5 mm at a constant speed in order to smooth the precursor solution in a predetermined thickness. In this condition, water was vaporized from the precursor solution. After fluidity of the precursor solution almost disappears, another precursor solution was cast on it again, swept by the doctor blade, and then the plate was heated at 110-125° C., for 1-2 hour. After that, the inorganic/polymeric hybrid membrane thus formed was stripped off from the plate to be washed with hot water and dried. The composition of this inorganic/polymeric hybrid is shown in Table 1. Although this is an example of process for the preparation of membranes, the inorganic/polymeric hybrid material can be obtained into any shape and size from the precursor solution.

In the case of the reinforcement by the matrix sheet, polyester or polypropylen non-woven cloth is sandwiched between the first cast and the second cast of the precursor solution. The aldehyde treatment was made by immersing the inorganic/polymeric hybrid membrane into the hydrochloric acid solution of 1.2 M concentration containing terephthalaldehyde for an hour at a room temperature.

1 cm² of hybrid inorganic/PVA membrane sample was clamped between two Teflon-windows and introduced into a round bottom flask equipped with a lateral stopcock. A nitrogen-degassed solution of Pd(NO$_3$)$_2$.2H$_2$O (1.87×10⁻³ M) in water was transferred and the suspension was stirred at room temperature for 24 h with the aid of an orbital shaker. After that time, the water solution was removed by decantation from the flask under a stream of nitrogen, the membrane was carefully washed with consecutive addition of degassed water portions (3×20 mL) and MeOH portions (3×20 mL) and dried under a stream of nitrogen.

After immobilization, the membrane was transferred into a stainless steel autoclave, freshly degassed methanol was transferred inside the reactor and the reactor was pressurized with 5 bar hydrogen in order to reduce Pd(II) to Pd (0). The solution was stirred at room temperature for 2 h. After that time, the autoclave was depressurized, and the solution was removed under a stream of hydrogen by a gas-tight syringe, and the membrane was washed with consecutive addition of degassed methanol portions (2×20 mL). The catalytic membrane assembly thus obtained can be stored under hydrogen and it is ready-to-use in an autoclave for subsequent catalytic hydrogenation reactions. For the purpose of evaluate the metal loading in the catalytic membrane, the membrane was removed from the Teflon holder, dried under vacuum overnight and analyzed by atomic absorption spectroscopy to give the Pd content.

Table 1 reports the compositions of the inorganic/polymeric hybrid catalytic membranes.

EXAMPLE II

This example illustrates another general procedure for the preparation of the catalytic materials, especially membranes, in accordance with the method of the present invention described above. A raw aqueous solution was obtained by mixing a predetermined amount of oxizirconium chloride and palladium chloride with a 100 ml of 10 weight % polyvinylalcohol solution. The PVA has average molecular weight of 146,000-186,000 and saponification degree of 100%.

This precursor solution was cast on the polyester film of the same coating equipment to EXAMPLE I in condition of heating the plate to a temperature of 60-80° C. Just after the precursor solution was cast on the plate, the precursor solution was swept by the doctor blade whose gap was adjusted to 0.5 mm at a constant speed in order to smooth the precursor solution in a predetermined thickness. In this condition, water was vaporized from the precursor solution. After fluidity of the precursor solution almost disappears, another precursor solution was cast on it again, swept by the doctor blade, and then the plate was heated at 110-140° C., for 1-2 hour. After that, this solid mixture membrane was stripped off from the plate and immersed in a 1.7 wt % aqueous solution of ammonia for 24 h. During this immersion process, oxyzirconium chloride and palladium chloride turn into zirconium oxide (zirconic acid) and palladium oxide (hydroxide), respectively. Thus prepared hybrid membrane was washed with hot water and dried. The composition of these membranes in reported in Table 1.

1 cm$^2$ of hybrid inorganic/PVA membrane sample was clamped between two Teflon-windows and introduced into a round bottom flask equipped with a lateral stopcock containing nitrogen-degassed water (15 mL). The suspension was cooled at 0° C. and, under a stream of nitrogen, a large excess of NaBH$_4$ was added in portions in order to reduce Pd(II) to Pd (0). The solution was stirred with an orbital-stirrer, under a nitrogen flow, for 24 h at room temperature. After that time, the water solution was removed by decantation under a stream of nitrogen, the membrane was carefully washed with consecutive additions of degassed water portions (3×20 mL) and methanol portions (3×20 mL) and dried under a stream of nitrogen. The catalytic membrane assembly thus obtained can be stored under hydrogen and it is ready-to-use in an autoclave for subsequent catalytic hydrogenation reactions. For the purpose of evaluate the metal loading in the catalytic membrane, the membrane was removed from the Teflon holder, dried under vacuum overnight and analyzed by atomic absorption spectroscopy to give the Pd content.

Figure 2:
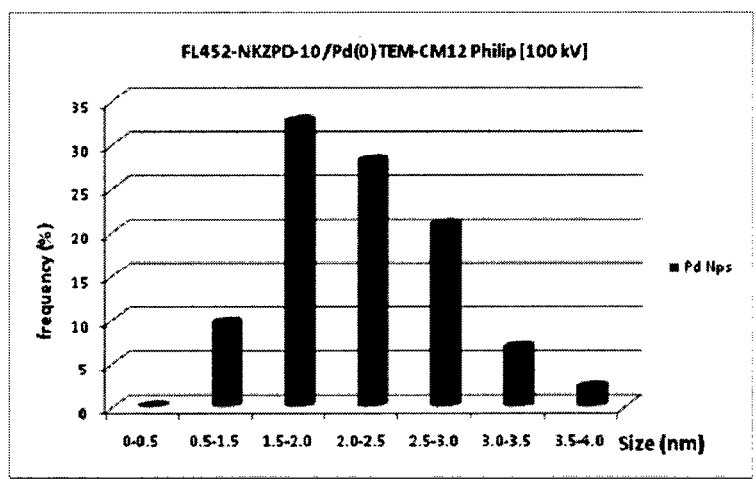
FIG. 2 is a typical size distribution of Pd NPs embedded into hybrid catalytic membrane.
Figure 3:
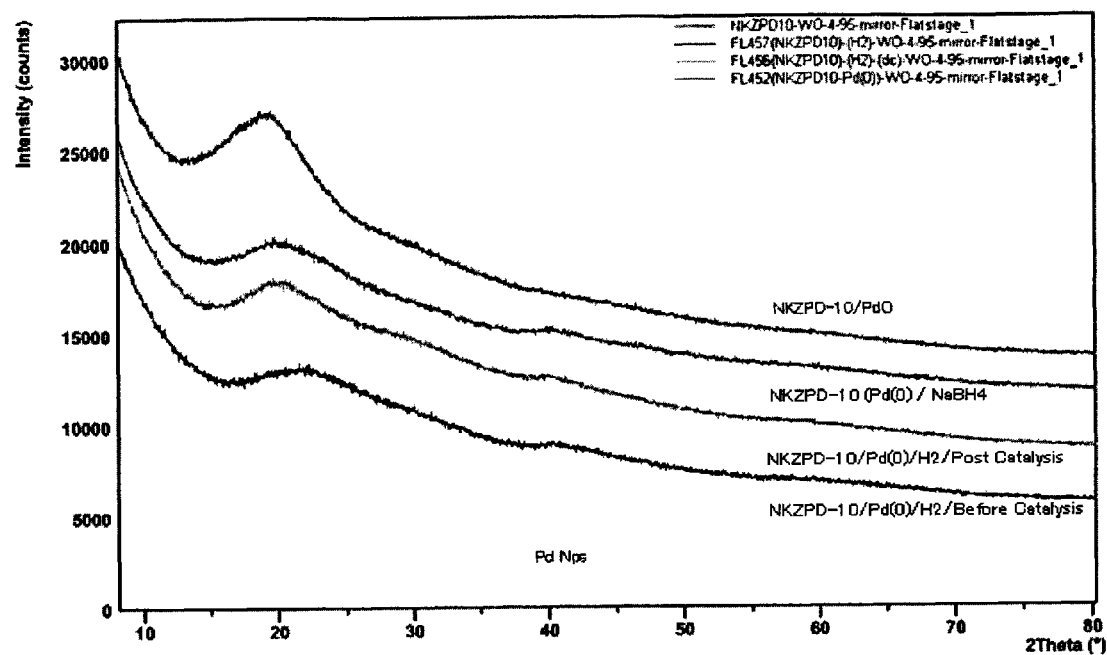
FIG. 3 is a typical XRD pattern of Pd NPs embedded into hybrid catalytic membrane, before and after catalysis.

Table 1 reports the compositions of the inorganic/polymeric hybrid catalytic membranes. Typical Transmission Electron Microscopy images and histogram, and X-ray Diffraction patterns of Pd nanoparticles embedded in the hybrid catalytic membrane are reported in FIG. 1, FIG. 2 and in FIG. 3, respectively.

EXAMPLE III

This example illustrates the general procedure for preparing catalytic materials, especially membranes, containing other metals than palladium. The hybrid membrane with ruthenium particles, rhodium particles and gold particles were prepared by substituting ruthenium chloride, rhodium chloride and gold chloride for the palladium chloride in the preparation method described in EXAMPLE II. The reduction step using NaBH$_4$ was accomplished as above described in EXAMPLE II. Compositions of these catalytic membranes are shown in Table 1.

The same preparing method can be adapted to any catalytic materials with iron, cobalt, nickel, copper, silver, osmium, iridium and platinum by substituting the salts of them for the palladium chloride in the method of EXAMPLE II.

EXAMPLE IV

This example illustrates the general procedure used for the catalytic hydrogenation reaction of various substrates using the catalytic hybrid PVA/inorganic membrane prepared as described in EXAMPLE I, II and III, in accordance with the method of the present invention described above.

A hydrogen degassed solution of the substrate in methanol was transferred via a Teflon® capillary under a stream of hydrogen into the autoclave containing the catalytic membrane assembly. The autoclave was degassed with 3 cycles vacuum/hydrogen then charged with the desired hydrogen pressure. The solution in autoclave was stirred at room temperature by a magnetic stirrer for the desired time. After that time, the autoclave was depressurized under a nitrogen flow and the reaction solution was removed from a bottom drain valve. A sample of this solution (0.5 µL) was analyzed by gas chromatography to determine the conversion and selectivity. The remaining solution aliquot was analyzed for the determination of the amount of metal leached into solution via ICP-AES analysis.

Recycling experiments were performed as follows: a hydrogen-degassed methanol solution of the substrate was transferred via a Teflon® capillary under a stream of hydrogen into the autoclave containing the catalytic membrane after use in the previous hydrogenation reaction. The autoclave was charged with the desired hydrogen pressure and the solution was stirred at room temperature for the desired. After that time, the autoclave was depressurized and the reaction solution was removed from the bottom drain valve, under a stream of hydrogen. A sample of this solution (0.5 µL) was analyzed by gas chromatography to determine the conversion and selectivity. The remaining solution aliquot was analyzed for the determination of the amount of metal leached into solution via ICP-AES analysis.

EXAMPLE V

This example illustrates the procedure used for the hydrogenation reaction of the methyl-2-acetamide acrylate using the catalytic hybrid PVA/inorganic membrane NKS-3 type containing silica and palladium NPs, and prepared as described in EXAMPLE I.

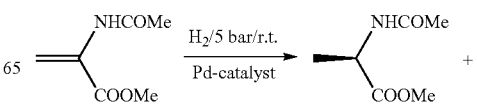

-continued

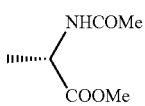

A hydrogen degassed 1.5×10⁻² M solution of the substrate in methanol (35 mL) was transferred via a Teflon capillary, under a stream of hydrogen, into the autoclave containing the catalytic membrane assembly (9 cm$^2$) (molar ratio substrate:Pd=317). The autoclave was degassed with 3 cycles vacuum/hydrogen and then charged with 5 bar hydrogen pressure. The solution in the autoclave was stirred at room temperature by an orbital-stirrer for 1 h. After that time, the autoclave was depressurized under a nitrogen flow and the reaction solution was removed from a drain bottom valve. A sample of this solution (0.5 μL) was analyzed by gas chromatography to determine the conversion using a 50 m×0.25 mm ID Lipodex-E (Macherey-Nagel) capillary column. The remaining solution aliquot was analyzed by ICP-AES to measure Pd leaching in solution (<1 ppm).

Recycling experiments were performed as follows: a hydrogen-degassed 1.5×10⁻² M methanol solution of the substrate (35 mL) was transferred via a Teflon® capillary under a stream of hydrogen, into the autoclave containing the catalytic membrane after use in the previous hydrogenation reaction. The autoclave was charged with 5 bar pressure and the solution was stirred with an orbital-stirrer at room temperature for 1 h. After that time, the autoclave was depressurized and the reaction solution was removed from the bottom drain valve, under a stream of hydrogen. A sample of this solution (0.5 μL) was analyzed by gas chromatography to determine the conversion.

Representative data for 7 recycling experiments are reported in Table 2.

EXAMPLE VI

This example illustrates the general procedure used for the hydrogenation reaction of methyl-2-acetamide acrylate using hybrid PVA-ZrO2 membranes containing Pd NPs prepared as described in EXAMPLE II, in accordance with the method of the present invention described above.

A hydrogen degassed 1.5×10⁻²M solution of the substrate in methanol was transferred via a Teflon capillary under a stream of hydrogen, into the autoclave containing the catalytic membrane assembly. The autoclave was degassed with 3 cycles vacuum/hydrogen then charged with the desired hydrogen pressure. The solution in autoclave was stirred at room temperature by a magnetic stirrer for the desired time. After that time, the autoclave was depressurized under a nitrogen flow and the reaction solution was removed from a bottom drain valve. A sample of this solution (0.5 μL) was analyzed by gas chromatography to determine the conversion using a 50 m×0.25 mm ID Lipodex-E (Macherey-Nagel) capillary column. The remaining solution aliquot was analyzed by ICP-AES to measure Pd leaching in solution (<1 ppm).

Representative results using various types of catalytic membranes are reported in Table 3.

EXAMPLE VII

This example illustrates the procedure used for the hydrogenation reaction of 3-hexyn-1-ol using the hybrid PVA-ZrO2 membranes containing Pd NPs of the NKZPD-9 type and prepared as described in EXAMPLE II, in accordance with the method of the present invention described above.

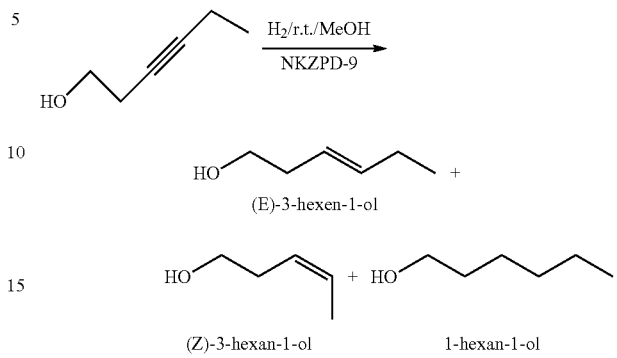

A hydrogen degassed solution of the substrate of 3-hexyn-1-ol (0.0529 mL, 0.484 mmol) in methanol (25 mL, conc. 0.019M) was transferred via a Teflon capillary under a stream of hydrogen, into the autoclave containing the catalytic membrane assembly. The autoclave was degassed with 3 cycles vacuum/hydrogen, then charged with the desired hydrogen pressure and the solution stirred at the desired temperature for different times. Representative results at different pressures and temperatures (r.t., −10° C., −20° C., −40° C.) are reported in Table 4, in which conversions and selectivities are compared. After that time, the autoclave was depressurized under a nitrogen flow and the reaction solution was removed from a bottom drain valve. A sample of this solution (0.5 μL) was analyzed by gas chromatography for the determination of conversion and selectivity to hexen-1-ol and stereoselectivity (Z/E) using a 30 m×0.25 mm ID VF-Wax ms capillary column. The remaining solution aliquot was analyzed by ICP-AES to measure Pd leaching in solution (<1 ppm).

EXAMPLE VIII

This example illustrates the procedure used for the hydrogenation reaction of 3-hexyn-1-ol using the hybrid PVA-ZrO2 membranes containing Pd NPs of the NKZPD-11 type and prepared as described in EXAMPLE II, in accordance with the method of the present invention described above.

A hydrogen degassed solution of the substrate of 3-hexyn-1-ol (0.0529 mL, 0.484 mmol) in methanol (25 mL, conc. 0.019M) was transferred via a Teflon capillary under a stream of hydrogen, into the autoclave containing the catalytic membrane assembly. The autoclave was degassed with 3 cycles vacuum/hydrogen then charged with 5 bar hydrogen pressure and the solution stirred at room temperature for 2 h. After that time, the autoclave was depressurized under a stream of hydrogen, and the reaction solution was removed from a bottom drain valve. A sample of this solution (0.5 μL) was analyzed by gas chromatography for the determination of conversion and selectivity to hexen-1-ol and stereoselectivity (Z/E) using a 30 m×0.25 mm ID VF-Wax ms capillary column. The remaining solution aliquot was analyzed by ICP-AES to measure Pd leaching in solution (<1 ppm).

Recycling experiments were performed as follows: a hydrogen-degassed solution of the substrate (0.0529 mL, 0.484 mmol) in methanol (25 mL, 0.019M)) was transferred via a Teflon® capillary under a stream of hydrogen, into the autoclave containing the catalytic membrane after its use in the previous hydrogenation reaction. The autoclave was charged with 5 bar pressure and the solution was stirred with a magnetic-stirrer at room temperature for the desired time. After that time, the autoclave was depressurized under a stream of hydrogen, and the reaction solution was removed from a bottom drain valve. A sample of this solution (0.5 µL) was analyzed by gas chromatography for the determination of conversion and selectivity to hexen-1-ol and stereoselectivity (Z/E) using a 30 m×0.25 mm ID VF-Wax ms capillary column.

Representative data for 6 recycling experiments are reported in Table 5.

TABLE 1

Compositions of catalytic membranes consisting of hybrid inorganic/polymeric membranes and MNPs

| Type | PVA | $SiO_2^a$ | $ZrO_2^b$ | $Pd^c$ | $Ru^d$ | $Rh^e$ | $Au^f$ | $sd^g$ |
|---|---|---|---|---|---|---|---|---|
| NKS-3 | 1 | 0.063 | 0 | * | 0 | 0 | 0 | 100% |
| NKZPD-1 | 1 | 0 | 0.093 | 0.023 | 0 | 0 | 0 | 100% |
| NKZPD-3 | 1 | 0 | 0.093 | 0.045 | 0 | 0 | 0 | 100% |
| NKZPD-4 | 1 | 0 | 0.093 | 0.052 | 0 | 0 | 0 | 100% |
| NKZPD-9 | 1 | 0 | 0.093 | 0.21 | 0 | 0 | 0 | 100% |
| NKZPD-10 | 1 | 0 | 0.093 | 0.18 | 0 | 0 | 0 | 100% |
| NKZPD-11 | 1 | 0 | 0.093 | 0.18 | 0 | 0 | 0 | 80% |
| NKZRU-1 | 1 | 0 | 0.093 | 0 | 0.11 | 0 | 0 | 100% |
| NKZRH-1 | 1 | 0 | 0.093 | 0 | 0 | 0.13 | 0 | 100% |
| NKZRH-2 | 1 | 0 | 0.093 | 0 | 0 | 0.067 | 0 | 100% |
| NKZAU | 1 | 0 | 0.093 | 0 | 0 | 0 | 0.092 | 100% |

$^a$Weight ratio of $SiO_2$ to PVA in membranes.
$^b$Weight ratio of $ZrO_2$ to PVA in membranes.
$^c$Weight ratio of Pd to PVA in membranes.
$^d$Weight ratio of Ru to PVA in membranes.
$^e$Weight ratio of Rh to PVA in membranes.
$^f$Weight ratio of Au to PVA in membranes.
$^g$Saponification degree.
* Pd content 0.26% (w/w) after impregnation with palladium nitrate and reduction with hydrogen. Data from AAS.

TABLE 2

Hydrogenation reaction of methyl-2-acetamideacrylate with Pd(0) immobilized onto NKS-3 membrane $^{(a)}$

| Cycle n. | Time (h) | Yield (%) | TOF ($h^{-1}$) |
|---|---|---|---|
| 1 | 1 | 85.36 | 271 |
| 2 | 1 | 97.91 | 311 |
| 3 | 1 | 94.04 | 299 |
| 4 | 1 | 100 | 317 |
| 5 | 1 | 100 | 317 |
| 6 | 1 | 81.50 | 259 |
| 7 | 1 | 77.60 | 246 |

$^{(a)}$ P = 5 bar, r.t, 1 h, methanol, conc = 1.5 × $10^{-2}$ M, Substrate/Pd = 317. Pd loading (0.26% w/w) from Atomic-Absorption analysis after impregnation with palladium nitrate and reduction with hydrogen

TABLE 3

Hydrogenation reaction of methyl-2-acetamide acrylate.

| Membrane Type | Reducing Agent | Pd Content$^{(a)}$ (% w/w) | Substrate/Pd | Time (h) | Yield (%)$^{(b)}$ | TOF ($h^{-1}$) |
|---|---|---|---|---|---|---|
| NKZPD-3 | $NaBH_4$ | 0.54 | 192 | 2 | 19.90 | 19 |
| NKZPD-4 | $NaBH_4$ | 1.6 | 364 | 2 | 16.85 | 31 |
| NKZPD-10 | $NaBH_4$ | 5.57 | 232 | 2 | 19.07 | 22 |
| NKZPD-9 | $NaBH_4$ | 3.62 | 91 | 2 | 26.7 | 12 |
| NKZPD-9 | $NaBH_4$ | 3.62 | 91 | 7 | 62.30 | 8 |

$^{(a)}$AAS-analysis after Pd reduction;
$^{(b)}$Reaction Condition: P = 5 bar, r.t., methanol.

TABLE 4

Hydrogenation reaction of 3-hexyn-1-ol with NKZPD-9

| Time (h) | P (bar) | T (° C.) | Yield(%)$^{(b)}$ | Selectivity to 3-hexen-1-ol | % (E/Z) | TOF ($h^{-1}$) |
|---|---|---|---|---|---|---|
| 2 | 5 | r.t | 51.3 | 45.5 | 72(Z) | 47 |
| 4 | 1 | r.t | 97.3 | 14.5 | 55(E) | 44 |
| 2 | 1 | r.t | 40.7 | 64.6 | 81(Z) | 37 |
| 4 | 1 | −10 | 96.3 | 50.8 | 72(Z) | 44 |
| 4 | 1 | −40 | 32.9 | 65.6 | 84(Z) | 15 |
| 8 | 1 | −20 | 84.0 | 55.5 | 77(Z) | 19 |

$^{(a)}$Pd Content: 3.62% w/w for AAS-analysis;
$^{(b)}$Reaction Condition: NKZPD-9 reduced with $NaBH_4$, Sustrate/Pd = 183; methanol.

TABLE 5

Hydrogenation reaction of 3-hexyn-1-ol with NKZPD-11 $^{(a)}$

| Cycle n. | Time (h) | Yield (%)$^{(b)}$ | Selectivity 3-hexen-1-ol | % (E/Z) | TOF ($h^{-1}$) |
|---|---|---|---|---|---|
| 1 | 2 | 47.2 | 45.0 | 69(Z) | 43 |
| 2 | 2 | 56.2 | 45.7 | 73.5(Z) | 51 |
| 3 | 2 | 38.0 | 45.0 | 75(Z) | 35 |
| 4 | 2 | 48.8 | 52.0 | 74.7(Z) | 45 |
| 5 | 16 | 99.4 | 21.6 | 51.6(E) | 11 |
| 6 | 2 | 42.5 | 69.7 | 77.9(Z) | 39 |

$^{(a)}$ Pd Content: 3.62% w/w for AAS-analysis;
$^{(b)}$Reaction Condition: NKZPD-11, reduced with $NaBH_4$, Catalysis: Sustrate/Pd = 183, P = 5 bar, r.t. Conc. Substrate = 0.019M

What is claimed is:

1. A catalytic material comprising metal particles with catalytic activity for chemical reactions and a hybrid compound comprised of a zirconic acid compound and polyvinyl alcohol, wherein
   1) the zirconic acid compound is chemically combined with the polyvinyl alcohol through the hydroxyl groups thereof,
   2) the hybrid compound immobilizes the metal particles with catalytic activity for chemical reactions,
   3) the metal of the metal particles with catalytic activity is at least one metal selected from the group consisting of iron, cobalt, nickel, copper, ruthenium, rhodium, palladium, silver, osmium, iridium, platinum, and gold, and
   4) the metal particles with catalytic activity are located on the surface of the hybrid compound and inside the hybrid compound when immobilized.

2. A catalytic material according to claim 1, wherein the metal of the metal particles with catalytic activity is palladium.

3. A catalytic material according to claim 1, wherein the catalytic material is a membrane.

4. A catalytic material comprising metal particles with catalytic activity for chemical reactions and a hybrid compound comprised of a zirconic acid compound and polyvinyl alcohol, wherein
1) the zirconic acid compound is chemically combined with the polyvinyl alcohol through the hydroxyl groups thereof,
2) the hybrid compound immobilizes the metal particles with catalytic activity for chemical reactions,
3) the metal particles with catalytic activity are located on the surface of the hybrid compound and inside the hybrid compound when immobilized,
4) the catalytic material is in the form of a membrane, and
5) the membrane has porous matrix sheet inside for reinforcement.

5. A catalytic material according to claim 1, 2, 3, or 4 wherein the chemical reaction is hydrogenation, dehydrogenation, hydroformylation, carbonylation, oxidation, dihydroxylation, epoxidation, amination, phosphination, carboxylation, silylation, isomerization, allylic alkylation, cyclopropanation, alkylation, arylation, metathesis or another C—C bond forming reaction.

6. A catalytic material according to claim 5, wherein the chemical reaction is hydrogenation.

7. A catalytic material according to claim 6, wherein the hydrogenation reaction is the hydrogenation of the alkene of the formula:

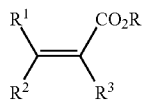

where R represents hydrogen, an alkyl group having from 1 to about 30 carbon atoms, or an aryl group having about from 6 to 18 carbon atoms,
each of $R_1$, $R_2$ and $R_3$, individually, represents hydrogen, an alkyl group having from 1 to about 30 carbon atoms, an alkenyl group having from 1 to about 30 carbon atoms, an alkynyl group having from 1 to about 30 carbon atoms, an aryl group having about from 6 to 18 carbon atoms, an amide group, an amine group, an alkoxide group having 1 to about 30 carbon atoms, an ester group having from 1 to 30 carbon atoms, a ketone group having from 1 to about 30 carbon atoms, wherein the aryl substituents may be bicyclic, fused compounds or an aryl substituent having a heteroatom.

8. A catalytic material according to claim 6, wherein the hydrogenation reaction is the hydrogenation of the alkyne of the formula:

where $R^1$ represents hydrogen, an alkyl group having from 1 to about 30 carbon atoms, an aryl group having about from 6 to 18 carbon atoms, amide, amine, an alkoxide group having from 1 to about 30 carbon atoms, an ester group having from 1 to about 30 carbon atoms, wherein the aryl substituent may also be a bicyclic, fused compound or an aryl substituent having heteroatoms.

9. A method for providing the catalytic material according to claim 1, comprising:
1) synthesizing the hybrid compound by neutralizing salts of the metal particles with catalytic activity and at least one of a zirconium salt and an oxyzirconium salt with alkali in a solution comprising the polyvinyl alcohol and thereafter removing the solvent, or immersing or smearing a solid mixture of the polyvinyl alcohol, salts of the metal particles with catalytic activity and at least one of the zirconium salt and the oxyzirconium salt with an alkali solution, and
2) reducing the synthesized hybrid compound to turn the salts of the metal particles with catalytic activity into metal particles.

10. A method for providing the catalytic material according to claim 9, wherein the reducing agent is at least one member selected from the group consisting of hydrogen, borohydride, formic acid, formate, ammonia, hydrazine and alcohol.

11. A catalytic material according to claim 1, wherein the metal of the metal particles with catalytic activity is at least one metal selected from the group consisting of iron, cobalt, nickel, copper, ruthenium, rhodium, silver, osmium, iridium, platinum and gold.

12. A catalytic material according to claim 1, wherein the metal particles with catalytic activity have a diameter of from 0.5 to 500 nm.

13. A catalytic material according to claim 1, wherein the metal of the metal particles with catalytic activity comprises palladium, and
the metal particles with catalytic activity have a diameter of from 0.5 to 500 nm.

14. A catalytic material according to claim 1, wherein the metal of the metal particles with catalytic activity is at least one metal selected from the group consisting of ruthenium, rhodium, palladium, silver, platinum, and gold.

15. A catalytic material according to claim 4, wherein the metal of the metal particles with catalytic activity is palladium.

16. A catalytic material according to claim 4, wherein the metal of the metal particles with catalytic activity is at least one metal selected from the group consisting of iron, cobalt, nickel, copper, ruthenium, rhodium, silver, osmium, iridium, platinum and gold.

17. A catalytic material according to claim 4, wherein the metal particles with catalytic activity have a diameter of from 0.5 to 500 nm.

18. A catalytic material according to claim 4, wherein the metal of the metal particles with catalytic activity is at least one metal selected from the group consisting of ruthenium, rhodium, palladium, silver, platinum, and gold.

19. A catalytic material according to claim 4, wherein the metal of the metal particles with catalytic activity comprises palladium, and
the metal particles with catalytic activity have a diameter of from 0.5 to 500 nm.

* * * * *